US006562892B2

(12) United States Patent
Eknoian et al.

(10) Patent No.: US 6,562,892 B2
(45) Date of Patent: May 13, 2003

(54) HIGHLY FUNCTIONAL POLYMER LATEX

(75) Inventors: Michael Eknoian, Warren, NJ (US); Donald R. Williams, Newtown, PA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/823,318

(22) Filed: Mar. 30, 2001

(65) Prior Publication Data

US 2003/0073777 A1 Apr. 17, 2003

(51) Int. Cl.[7] ............................. C08J 3/02; C08K 3/20
(52) U.S. Cl. ...................................................... 524/457
(58) Field of Search ............................ 524/457, 819; 358/302

(56) References Cited

U.S. PATENT DOCUMENTS

| 3,644,262 A | 2/1972 | Stehle et al. ............ 260/29.6 R |
| 4,309,469 A | 1/1982 | Varona .......................... 428/74 |
| 5,312,883 A | 5/1994 | Komatsu et al. ......... 526/318.44 |
| 5,319,027 A | 6/1994 | Bott et al. ................... 525/221 |
| 5,631,317 A | 5/1997 | Komatsu et al. ............. 524/561 |
| 6,001,910 A | 12/1999 | Blumenthal et al. ......... 524/277 |

FOREIGN PATENT DOCUMENTS

| EP | 0 990 688 | 4/2000 | ........... C09J/123/08 |
| WO | WO 00/38751 | 7/2000 | ........... A61L/15/62 |
| WO | WO 01/83866 A2 * | 11/2001 | |

* cited by examiner

Primary Examiner—Kriellion A. Sanders
(74) Attorney, Agent, or Firm—Thomas F. Roland

(57) ABSTRACT

The present invention is directed to an ethylene-vinyl acetate emulsion polymer having at least 55 percent by weight of ethylene, which is water-dispersible, yet non-dispersible in an aqueous solution containing 0.5 percent or more of an inorganic salt. The invention is also directed to salt sensitive emulsion polymers containing a water-dispersible polymer having a Tg of less than 25° C., which are non-dispersible in aqueous solutions containing 0.5 weight percent or more of an inorganic salt. The invention is also directed to an ethylene/vinyl acetate emulsion polymer having at least 55 percent by weight of ethylene, and a process for producing said emulsion polymer.

20 Claims, No Drawings

HIGHLY FUNCTIONAL POLYMER LATEX

FIELD OF THE INVENTION

This invention relates to high ethylene ethylene-vinyl acetate (EVA) emulsions comprising a water dispersible copolymer which is non-dispersible in aqueous solutions containing 0.5 weight percent or more of an inorganic salt. The invention also relates to ethylene-vinyl acetate emulsions containing at least 55 percent by weight of ethylene, and a process for producing said high ethylene EVA emulsions. The invention also relates to emulsions comprising a water dispersible polymer which is non-dispersible in aqueous solutions containing 0.5 weight percent or more of an inorganic salt, where the polymer has a Tg of less than 25° C.

BACKGROUND OF THE INVENTION

Ethylene-vinyl acetate (EVA) polymers provide useful properties at relatively low cost in many industrial applications. Ethylene monomer is a low-cost monomer and therefore incorporation of as much ethylene as possible into an ethylene-vinyl acetate polymer allows one to take advantage of cost and performance benefits.

U.S. Pat. No. 3,644,262 discloses a process for increasing the ethylene content of an EVA emulsion. An ethylene content of 5 to 40 percent is targeted in the patent, and examples of copolymers containing 11 to 21 percent ethylene are cited.

EP 0 990 688 describes an EVA pressure sensitive adhesive containing carboxyl monomer. Said PSA has an ethylene content of greater than 45 percent, and most preferably from 45 to 55 percent.

Salt sensitive polymers are dispersible in water, but non-dispersible in salt solutions. Said polymers are useful in applications where a film is desired which will dissolve or disperse in water. Such applications include polymer products which can be disposed of in water, where the film will disperse.

U.S. Pat. No. 5,312,883 discloses a composition of a water-soluble polymer that is insoluble in 0.5% salt solutions. The composition requires 30 to 75% acrylic acid, 5 to 30 percent of a $C_8$ to $C_{12}$ alkyl (meth)acrylate, and 20 to 40 percent of a $C_2$ to $C_4$ alkyl (meth)acrylate. The disclosure is limited to acrylic acid copolymers and specific (meth) acrylates. Also, the disclosed process for preparing these polymers is costly and time consuming.

WO 00/38751 discloses an ion-sensitive polymer which is insoluble in a neutral salt solution containing at least 0.3 weight percent salt, and is soluble in tap water containing 15 ppm to 500 ppm of one or more multivalent ions. Said polymers are formed as solution polymers.

U.S. patent application Ser. No. 09/540,033 describes salt sensitive aqueous emulsions which are non-dispersible in aqueous solutions containing 0.5% or more of an inorganic salt which contain a copolymer of an 10 to 90 percent of an acid monomer and a second monomer.

Surprisingly, it has been found that EVA emulsion polymers containing a high level of ethylene can be produced without a carboxyl-containing monomer. Said polymers, using other functional comonomers, produce better properties than carboxyl-containing EVAs. It has also been found that stable EVA emulsion polymers, having an ethylene content of greater than 55 percent by weight, can be obtained. Also, it has been found that emulsions can be produced which form flexible films that are dispersible in water but not in an aqueous solution containing 0.5 percent or more of an inorganic salt. The combination of these two findings yields a high ethylene content ethylene-vinyl acetate emulsion polymer capable of forming a film which is redispersible in water but non-redispersible in a 0.5 percent or greater inorganic salt solution.

SUMMARY OF THE INVENTION

The present invention is directed to an ethylene-vinyl acetate emulsion polymer comprising:
  a) a copolymer of ethylene and vinyl acetate having greater than 55 percent by weight ethylene; and
  b) a hydrophilic polymeric colloid stabilizer wherein said hydrophobic colloid comprises from 1 to 100 percent by weight of an acidic ethylenically unsaturated monomer; wherein said ethylene-vinyl acetate copolymer is water-dispersible, and wherein said ethylene-vinyl acetate copolymer is non-dispersible in an aqueous solution containing 0.5 weight percent or more of an inorganic salt.

In a second embodiment, the present invention is directed to an aqueous emulsion comprising a water-dispersible polymer which is non-dispersible in aqueous solutions containing 0.5 weight percent or more of an inorganic salt, wherein said water-dispersible polymer comprises from 1 to 100 percent by weight of a hydrophilic monomer and from 0 to 99 percent by weight of at least one non-hydrophilic monomer, wherein a film formed from said polymer has a Tg of less than 25° C.

In a third embodiment, the present invention is directed to a high ethylene, ethylene-vinyl acetate emulsion polymer comprising greater than 55 percent by weight of ethylene, and to a process for producing said high ethylene content EVA polymer.

DETAILED DESCRIPTION OF THE INVENTION

The present invention is directed to salt-sensitive emulsion polymers containing a water-dispersible polymer which is non-dispersible in aqueous solutions containing 0.5 weight percent or more of an inorganic salt. The invention is also directed to an ethylene-vinyl acetate emulsion polymer having at least 55 percent by weight of ethylene, and a process for producing said emulsion polymer. The invention is also directed to a combination of the above two concepts producing a high ethylene content EVA emulsion polymer which is water-dispersible, yet non-dispersible in an aqueous solution containing 0.5 percent or more of an inorganic salt.

Salt Sensitive Emulsion Polymers

Salt sensitive emulsion polymers are polymers which are formed by an emulsion polymerization process, and which form films that are dispersible in tap water, yet are non-dispersible in water containing at least 0.5 percent by weight of an inorganic monovalent, divalent, or trivalent salt, or mixtures thereof The polymer is dispersible, rather than soluble, in water. Dispersible, as used herein, means that in tap water, a film formed from the polymer breaks into small discrete pieces or particles that can be filtered out. These pieces are capable of being filtered from the water. While not being bound to a theory, it is believed that the dispersion of the polymer film is related to the fact that a film forms from an emulsion by coalescence of polymer particles, forming weak bonds between particles. In water, some bonds between the particles will break, resulting in clusters of polymer particles. This is different from a solution polymer in which polymer chains mix and entangle during film formation, and this film dissolves into individual polymer chains, which cannot be filtered. Since the polymer contains a high level of hydrophilic monomer(s), when the emulsion dries to a film, the particles are easily dispersed in water.

The emulsion polymers of the present invention consist of a polymer which is stabilized by a hydrophilic polymeric colloid. The polymer itself is not salt sensitive. The colloid may or may not be salt sensitive. However, the colloid-stabilized polymer particle is salt sensitive.

The polymer colloid contains at least one monomer, and ideally two or more monomers. At least one of the monomers is a hydrophilic monomer.

The hydrophilic monomer may be an acidic monomer containing a carboxylic acid, a dicarboxylic acid, a sulfonic acid, or a phosphonic acid group, or a mixture thereof. Examples of carboxylic acid monomers include, but are not limited to, acrylic acid, methacrylic acid, maleic acid, maleic acid half esters, maleic anhydride, itaconic acid, and crotonic acid. Preferred carboxylic acids include acrylic acid and methacrylic acid. Sulfonic acid monomers include, but are not limited to styrene sulfonic acid, 2-acrylamido-2-methyl-1-propanesulfonic acid, vinylsulfonic acid, and the salts of these acids. Examples of monomers containing a phophonic acid group include, but are not limited to styrene phosphonic acid, sodium vinyl phosphonate, vinylphosphoric acid, and $CH_2=C(CH_3)COO(CH_2)_nOPO_3H$, where n is from 2 to 4. A preferred phosphoric acid monomer is vinyl phosphonic acid. Other hydrophilic monomers include, but are not limited to, those containing a hydroxyl group, acrylamides and methacrylamides.

The polymer colloid may also contain at least one other monomer. Examples of monomers useful in the present invention include but are not limited to dimethyl (meth)acrylamide, N,N-diethyl (meth)acrylamide, N,N-dipropyl (meth)acrylamide, N,N-dibutyl (meth) acrylamide, N,N-di-t-octyl (meth)acrylamide, 2-(dimethylamino)ethyl (methacrylate), N-[3-(dimethylamino)propyl] (meth)acrylamide, N-metholyl (meth)acrylamide, N-(isobutoxymethyl)acrylamide, acrylonitrile, N-vinyl formamide, vinyl pyrrolidone, N-caprolactam, t-octyl (meth)acrylamide. Those skilled in the art can envision linear and branched versions as well as higher alkyl chains.

Vinyl Esters

Vinyl formate, vinyl acetate, vinyl propionate, vinyl isobutyrate, vinyl pivalate, vinyl 2-ethylhexonate, vinyl p-t-butyl berzoate, vinyl ester of versatic acid (i.e. Veo Va 10, Veo Va 11, Veo Va 12), vinyl laurate, vinyl stearate, vinyl eichoanate, vinyl docosanate. Those skilled in the art can envision linear and branched versions as well as higher alkyl chains.

Alcohol Functional

1-Hydroxymethyl (meth)acrylate, 2-hydroxymethyl (meth)acrylate, 1-hydroxyethyl (meth)acrylate, 2-hydroxyethyl (meth)acrylate, 1-hydroxypropyl (meth) acrylate, 2-hydroxypropyl (meth)acrylate, 3-hydroxypropyl (meth)acrylate. Those skilled in the art can envision linear and branched versions as well as higher alkyl chains.

Unsaturated Hydrocarbons

Ethylene, propylene, butylene, butadiene. Those skilled in the art can envision linear and branched versions as well as higher alkyl chains.

| (Meth)acrylates | | |
|---|---|---|
| $CH_2=C(R)-COOR_1$ | R = H or $CH_3$ | $R_1 = C_1-C_{18}$ |
| Maleates | | |
| $R_1OOC-CH=CH-COOR_2$ | $R_1$ = H or $C_1-C_{18}$<br>$R_1 = R_2 \neq H$ | $R_2$ = H or $C_1-C_{18}$ |
| (Meth)acrylamides | | |
| $CH_2=C(R)-CO-N(R_1)(R_2)$ | R = H or $CH_3$<br>$R_2$ = H or $C_1-C_{10}$ | $R_1$ = H or $C_1-C_{10}$ |
| Vinyl esters | | |
| $CH_2=C(R)-O-COR_1$ | R = H or $CH_3$ | $R_1 = C_1-C_{18}$ |
| Itaconates | | |
| $CH_2=C(COOR_1)-CH_2-COOR_2$ | $R_1$ = H or $C_1-C_{18}$<br>$R_1 = R_2 \neq H$ | $R_2$ = H or $C_1-C_{18}$ |
| Styrenics | | |
| 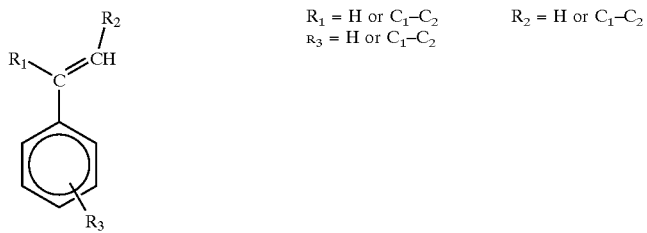 | $R_1$ = H or $C_1-C_2$<br>$R_3$ = H or $C_1-C_2$ | $R_2$ = H or $C_1-C_2$ |
| Unsat. Hydrocarbons & Acrylonitrile | | |
| $CH(R_1)=CH(R_2)$ | $R_1$ = H, C≡N, $C_1-C_{18}$ | $R_2$ = H, C≡N, $C_1-C_{18}$ |

Nitrogen Functional (Meth)acrylamide, N-methyl (meth)acrylamide, N-ethyl (meth)acrylamide, N-propyl (meth)acrylamide, N-butyl (meth)acrylamide, N-t-octyl (meth)acrylamide, N,N-

(Meth)acrylates

Methyl (meth)acrylate, ethyl (meth)acrylate, propyl (meth)acrylate, butyl (meth)acrylate, pentyl (meth)acrylate, hexyl (meth)acrylate, heptyl (meth)acrylate2-ethyl hexyl (meth)acrylate, octyl (meth)acrylate, t-octyl (meth)acrylate, nonyl (meth)acrylate, decyl (meth)acrylate, isobornyl (meth) acrylate, lauryl (meth)acrylate, steryl (meth)acrylate, cyclohexyl(meth)acrylate, 1-hydroxymethyl (meth)acrylate, 2-hydroxymethyl (meth)acrylate, 1-hydroxyethyl (meth) acrylate, 2-hydroxyethyl (meth)acrylate, 1-hydroxypropyl (meth)acrylate, 2-hydroxypropyl (meth)acrylate, 3-hydroxypropyl (meth)acrylate.

The hydrophilic monomer(s) is present in the polymer colloid at from 1 to 100 percent by weight. Other ethylenically unsaturated monomers may be present at from 0 to 99 percent by weight. Preferably the hydrophilic monomer is present in the polymer colloid at from 10 to 100 percent and most preferably from 30 to 99.

A graft-linker and/or crosslinker can be incorporated into the polymer colloid. Examples of graft-linkers and/or crosslinkers useful in the present invention include, but are not limited to, diallyl phthalate, diallyl amine, allyl methacrylate, ethylene glycol diacrylate, 1,6-hexane diacrylate, methylene bisacrylamide, divinyl benzene, triallyl amine, triallyl cyanurate, and trimethylolpropane triacrylate.

The polymer colloid of the invention may be used to stabilize a latex polymer. The colloid itself can be either salt sensitive or non-salt sensitive. The colloid can either be added to the polymerization process separately, or be formed in situ.

Examples of colloids that are salt sensitive include, but are not limited to, poly(acrylic acid), poly(methacrylic acid), and copolymers thereof.

Examples of colloids that are not salt sensitive include, but are not limited to, the salts of poly(2-acrylamido-2-methyl-1-propanesulfonic) acid, the salts of polyphosponic acid, and polyols.

The colloid is present in the latex polymer at from 0.1 to 100 percent by weight based on polymer solids, more preferably 1 to 75 weight percent, and most preferably from 3–75 weight percent.

The latex polymers of the present invention have a Tg of below 25° C. and preferably below 0° C. Films formed from these polymer emulsions are flexible at room temperature.

The process for producing salt sensitive emulsions of the invention involves the formation of a colloid stabilizer, followed by an emulsion polymerization using said stabilizer by means known in the art. The stabilizer may either be formed in situ, or added separately. A useful process for producing the salt sensitive emulsions is found in U.S. patent application Ser. No. 09/540,033, incorporated herein by reference. The emulsion polymerization may be a batch, semi-batch, or continuous process.

One preferred process involves an in situ colloid process in which a polymer seed is polymerized from one or more monomers selected from unsaturated acidic monomers, alkyl(meth)acrylates and vinyl monomers which are neutralized to between 1 and 100 percent with base to form a stabilizer. Using this stabilizer, monomers are added and polymerized by means known in the art of emulsion polymers.

Another preferred process involves the use of a hydrophilic polymer colloid, as described above as a stabilizer in the synthesis of an ethylene-vinyl acetate copolymer, where the level of ethylene in the copolymer is at least 55 percent by weight of the polymer.

The salt sensitive emulsion polymer is useful in protective top coats, floor polishes, temporary printing, adhesive binders, skin creams, sun screens, temporary decorative paints, marine coatings, repulpable paper coatings, glass fiber sizing, time release/erodable coatings or particles, and personal care products such as, for example, an antiperspirant film not removed by perspiration but removed by soap and water.

The emulsion polymer may be part of a final formulation containing components known in the art in conventional amounts. The other components may include, but are not limited to, plasticizers, tackifiers, fillers, humectants, and surfactants.

High Ethylene Content EVA Emulsions

The present invention also relates to ethylene-vinyl acetate emulsion copolymers containing greater than 55 percent by weight of ethylene, and a process for producing said polymers. Preferably, ethylene is present in the polymers at a level greater than 55 percent by weight, more preferably greater than 60 percent by weight, and most preferably at a level greater than 65 percent by weight.

In addition to ethylene and vinyl acetate, the polymers of the present invention may optionally include one or more other ethylenically unsaturated monomers. Preferably, the high ethylene EVA copolymer is free of carboxyl containing monomers such as acrylic and methacrylic acid. Monomers useful in the present invention may include functionalized monomers. Examples of functionalized monomers useful in the present invention include, but are not limited to nitrogen functional monomers, vinyl esters, alcohol functional monomers, and (meth)acrylates. Preferred monomers include N-methylol acrylamide, acrylamide, hydroxyethyl acrylate, hydroxypropyl acrylate, hydroxybutyl acrylate, acrylamidopropyl sulfonate and salts thereof, acrylonitrile, ammonium acrylamidylpropyl sulfonate. An especially preferred functionalized monomer is N-methylol acrylamide. A functionalized monomer may be present in the polymer at a level of up to 25 percent by weight, preferably up to 20 percent by weight, and most preferably up to 15 percent by weight, based on the polymer.

The emulsion polymer is formed using a stabilizer. The stabilizer can be either a surfactant or a colloid. The surfactant can be any surfactant known in the art. Preferably the surfactant is an anionic or non-ionic surfactant, or a mixture of said surfactants. A preferred non-ionic surfactant is a non-alkoxyphenol-based surfactant. Preferably the surfactant is an ethoxylated alcohol. Preferred anionic surfactants are sulfonate or sulfate salts, most preferably sulfosuccinic acid derivatives.

The emulsion polymer can be formed by a surfactant-free process using a polymeric colloid stabilizer. The colloid stabilizer may be formed in situ or added separately. By selecting a colloid stabilizer, as described above, the EVA polymer can be salt sensitive.

The EVA emulsion polymer is formed using the following process. A small initial charge is added to a reactor, preferably from 0 to 10 percent based on the weight of polymer. The initial charge and slow feed contain an amount of stabilizer sufficient to maintain emulsion stability, preferably from 0.5 to 10 percent by weight based on the weight of the polymer. Ethylene pressure is maintained in the reactor at a pressure above 500 psi, preferably above 1100 psi, and most preferably from 700 to 1400 psi, from before initiation until after the reaction is complete. The conversion is kept high throughout the reaction by sufficient agitation and a temperature high enough to ensure rapid conversion, yet low enough to encourage ethylene solubility. The temperature of the reaction is maintained at from 25 to 100° C., and preferably at from 50 to 80° C. A slow monomer feed is used, lasting from 1 to 10 hours, preferably from 2 to 6 hours and most preferably from 3 to 5 hours.

Formation of the EVA emulsion polymer is facilitated by the use of a polymerizable stabilizer such as sodium vinyl sulfonate, vinyl phosphonic acid, acrylamido-2-methyl-1-propanesulfonic acid, and their salts and derivatives. Preferably, the polymerizable stabilizer is sodium vinyl sulfonate. The polymerizable stabilizer is incorporated into the polymer at from 0 to 5 percent by weight, preferably from 0.1 to 4 percent by weight, and most preferably from 0.5 to 3 percent by weight, based on the weight of the EVA polymer.

High ethylene content EVA polymers have excellent peel and shear properties. The polymers also exhibit excellent tack without a tackifier. High ethylene EVAs are useful in repulping operations allowing paper to be recycled without requiring removal of the polymer in a separate expensive step. High ethylene EVA polymers are also useful in many industrial application such as, but not limited to, pressure sensitive adhesives, nonwoven binders, paper saturation binders, repulpable paper coatings, adhesive binders, salt-triggerable polymer systems.

The polymers of the present invention can be used to produce environmentally friendly products, such as less expensive paper recycle and flushable hygienic products.

This invention will be further clarified by use of the following examples which are not intended to restrict the scope of the invention. For examples 1–24, the copolymer was prepared in a 10 liter stainless steel medium pressure reactor. The reactor was equipped with a jacket for heating and cooling, a two-blade 45 degree pitched blade turbine and metering pumps for addition of various reaction components. Only deionized water was used for these batches.

The ethylene content was measured using a C-13 NMR technique in which the splitting of the —-CHOAc-carbon is integrated.

EXAMPLE 1

The reactor was charged with 2,831.38 g water, 42.2 g AEROSOL A102 (sulfosuccinate, Cytec) (31% solution), 9.53 g TERGITOL 15S5 (ethoxylated alcohols, Union Carbide), 45.47 g TERGITOL 15S40 (ethoxylated alcohols, Union Carbide),, (70% solution), 81.67 g Sodium Vinyl Sulfonate (25% solution), 10.89 g iron sulfate hexahydrate (1% solution), 10.89 g VERSENE (tetrasodium EDTA, Dow Chemical), 1.09 g sodium formaldehyde sulfoxylate, 0.35 g sodium acetate and 108.9 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (395.18 g water and 81.65 g t-butyl hydroperoxide) and a buffered sodium formaldehyde sulfoxylate solution (396.75 g water, 73.02 g sodium formaldehyde sulfoxylate and 3.44 g sodium acetate) was commenced at a 2 hour addition rate. When temperature rise indicated initiation, the jacket temperature was increased to 70° C. and a slow addition of an emulsified monomer mix consisting of 507.22 g water, 17.42 g TERGITOL 15S5, 99.1 g TERGITOL 15S40 (70% solution), 123.06 g AEROSOL A102 (31% solution), 25.19 g AEROSOL OT-75 (sulfosuccinate, Cytec) (75% solution), 81.67 g sodium vinyl sulfonate (25% solution), 1.24 g sodium acetate, 31.31 g acrylic acid and 2,116.73 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out.

The contents were then cooled to 55° C. and transferred to a 20 liter vessel to remove any unreacted ethylene. The following solutions were added to reduce the amount of unreacted monomer: 3.81 g t-butyl hydroperoxide in 15.52 g water and 3.81 g sodium formaldehyde sulfoxylate in 15.52 g water.

The physical properties of the latex were:

| % Solids | 51.1% |
|---|---|
| % Ethylene | 58.8% |

The batch was stable for a day and then coagulated.

EXAMPLE 2

The reactor was charged with 2,896.04 g water, 12.59 g AEROSOL A102 (31% solution), 3.02 g TERGITOL 15S5, 14.35 g TERGITOL 15S40, (70% solution), 75.55 g Sodium Vinyl Sulfonate (25% solution), 10.07 g iron sulfate hexahydrate (1% solution), 10.07 g VERSENE, 1.01 g sodium formaldehyde sulfoxylate, 0.33 g sodium acetate and 100.73 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (337.97 g water and 69.83 g t-butyl hydroperoxide) and a buffered sodium formaldehyde sulfoxylate solution (337.97 g water, 69.18 g sodium formaldehyde sulfoxylate and 2.94 g sodium acetate was commenced at a 2 hour addition rate. When temperature rise indicated initiation, the jacket temperature was increased to 70° C. and a slow addition of an emulsified monomer mix consisting of 579.21 g water, 21.91 g TERGITOL 15S5, 119.37 g TERGITOL 15S40 (70% solution), 140.27 g AEROSOL A102 (31% solution), 23.30 g AEROSOL OT-75 (75% solution), 151.10 g sodium vinyl sulfonate (25% solution), 1.15 g sodium acetate, 28.96 g acrylic acid and 1,957.98 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out.

The contents were then cooled to 55° C. and transferred to a 20 liter vessel to remove any unreacted ethylene. The following solutions were added to reduce the amount of unreacted monomer: 3.53 g t-butyl hydroperoxide in 14.35 g water and 3.53 g sodium formaldehyde sulfoxylate in 14.35 g water.

The physical properties of the latex were:

| % Ethylene | 60.2% |
|---|---|

The next day, the batch had a separation layer on top.

EXAMPLE 3

The reactor was charged with 2,896.04 g water, 8.81 g AEROSOL A102 (31% solution), 2.01 g TERGITOL 15S5, 9.57 g TERGITOL 15S40, (70% solution), 75.55 g Sodium Vinyl Sulfonate (25% solution), 10.07 g iron sulfate hexahydrate (1% solution), 10.07 g VERSENE, 1.01 g sodium formaldehyde sulfoxylate, 0.33 g sodium acetate and 100.73 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (323.46 g water and 66.83 g t-butyl hydroperoxide) and a buffered sodium formaldehyde sulfoxylate solution (323.46 g water, 59.52 g sodium formaldehyde sulfoxylate and 2.94 g sodium acetate) was commenced at a 2 hour addition rate. When temperature rise indicated initiation, the jacket temperature was increased to 70° C. and a slow addition of an emulsified monomer mix consisting of 579.21 g water, 22.92 g TERGITOL 15S5, 124.15 g TERGITOL 15S40 (70% solution), 144.05 g AEROSOL A102 (31% solution), 23.30 g AEROSOL OT-75 (75% solution), 151.10 g sodium vinyl sulfonate (25% solution), 1.15 g sodium acetate, 28.96 g acrylic acid and 1,957.98 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as. needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out.

The contents were then cooled to 55° C. and transferred to a 20 liter vessel to remove any unreacted ethylene. The following solutions were added to reduce the amount of unreacted monomer: 3.53 g t-butyl hydroperoxide in 14.35 g water and 3.53 g sodium formaldehyde sulfoxylate in 14.35 g water.

The physical properties of the latex were:

| % Solids | 49.4% |
| % Ethylene | 62.4% |
| Viscosity | 75 cP |
| pH | 5.4 |

The batch had a very thin layer of separation on top.

EXAMPLE 4

Surfactant Post-add

The reactor was charged with 2,896.04 g water, 8.81 g AEROSOL A102 (31% solution), 2.01 g TERGITOL 15S5, 9.57 g TERGITOL 15S40, (70% solution), 75.55 g Sodium Vinyl Sulfonate (25% solution), 10.07 g iron sulfate hexahydrate (1% solution), 10.07 g VERSENE, 1.01 g sodium formaldehyde sulfoxylate, 0.33 g sodium acetate and 100.73 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (322.16 g water and 68.63 g t-butyl hydroperoxide) and a buffered sodium formaldehyde sulfoxylate solution (339.42 g water, 62.45 g sodium formaldehyde sulfoxylate and 2.95 g sodium acetate) was commenced at a 2 hour addition rate. When temperature rise indicated initiation, the jacket temperature was increased to 70° C. and a slow addition of an emulsified monomer mix consisting of 579.21 g water, 22.92 g TERGITOL 15S5, 124.15 g TERGITOL 15S40 (70% solution), 144.05 g AEROSOL A102 (31% solution), 23.30 g AEROSOL OT-75 (75% solution), 151.10 g sodium vinyl sulfonate (25% solution), 1.15 g sodium acetate, 28.96 g acrylic acid and 1,957.98 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out. After the reaction was complete, a solution of 3.78 g TERGITOL 15S5, 20.40 g TERGITOL 15S40 (70% solution), 23.92 g AEROSOL A102 (31% solution) and 3.78 g AEROSOL OT-75 (755 solution) was added to the reactor.

The contents were then cooled to 55° C. and transferred to a 20 liter vessel to remove any unreacted ethylene. The following solutions were added to reduce the amount of unreacted monomer: 3.53 g t-butyl hydroperoxide in 14.35 g water and 3.53 g sodium formaldehyde sulfoxylate in 14.35 g water.

The physical properties of the latex were:

| % Solids | 48.2% |
| % Ethylene | 63% |
| Viscosity | 56 cP |
| pH | 5.4 |
| Residual VA | 3410 ppm |

The batch was stable for a week. It has shown promise as a repulpable paper coating.

EXAMPLE 5

Surfactant Redistribution

The reactor was charged with 2,896.04 g water, 5.29 g AEROSOL A102 (31% solution), 1.51 g TERGITOL 15S5, 6.30 g TERGITOL 15S40, (70% solution), 75.55 g Sodium Vinyl Sulfonate (25% solution), 10.07 g iron sulfate hexahydrate (1% solution), 10.07 g VERSENE, 1.01 g sodium formaldehyde sulfoxylate, 0.33 g sodium acetate and 100.73 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (297.35 g water and 61.44 g t-butyl hydroperoxide) and a buffered sodium formaldehyde sulfoxylate solution (295.90 g water, 54.45 g sodium formaldehyde sulfoxylate and 2.57 g sodium acetate) was commenced at a 2 hour addition rate. When temperature rise indicated initiation, the jacket temperature was increased to 70° C. and a slow addition of an emulsified monomer mix consisting of 579.21 g water, 23.42 g TERGITOL 15S5, 127.43 g TERGITOL 15S40 (70% solution), 147.32 g AEROSOL A102 (31% solution), 23.30 g AEROSOL OT-75 (75% solution), 151.10 g sodium vinyl sulfonate (25% solution), 1.15 g sodium acetate, 28.96 g acrylic acid and 1,957.98 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out. After the reaction was complete, a solution of 3.78 g TERGITOL 15S5, 20.40 g TERGITOL 15S40 (70% solution), 23.92 g AEROSOL A102 (31% solution) and 3.78 g AEROSOL OT-75 (755 solution) was added to the reactor.

The contents were then cooled to 55° C. and transferred to a 20 liter vessel to remove any unreacted ethylene. The following solutions were added to reduce the amount of unreacted monomer: 3.53 g t-butyl hydroperoxide in 14.35 g water and 3.53 g sodium formaldehyde sulfoxylate in 14.35 g water.

The physical properties of the latex were:

| % Solids | 48.1% |
| % Ethylene | 59% |
| Viscosity | 45 cP |
| pH | 5.2 |
| Residual VA | 5380 ppm |

The batch was stable for over a week.

EXAMPLE 6

Surfactant Post-add

The reactor was charged with 2,896.04 g water, 5.29 g AEROSOL A102 (31% solution), 1.51 g TERGITOL 15S5, 6.30 g TERGITOL 15S40, (70% solution), 75.55 g Sodium Vinyl Sulfonate (25% solution), 10.07 g iron sulfate hexahydrate (1% solution), 10.07 g VERSENE, 1.01 g sodium formaldehyde sulfoxylate, 0.33 g sodium acetate and 100.73 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (287.20 g water and 59.34 g t-butyl hydroperoxide) and a buffered sodium formaldehyde sulfoxylate solution (288.65 g water, 53.11 g sodium formaldehyde sulfoxylate and 2.51 g sodium acetate) was commenced at a 2 hour addition rate. When temperature rise indicated initiation, the jacket temperature was increased to 70° C. and a slow addition of an emulsified monomer mix consisting of 579.21 g water, 23.42 g TERGITOL 15S5, 127.43 g TERGITOL 15S40 (70% solution), 147.32 g AEROSOL A102 (31% solution), 23.30 g AEROSOL OT-75 (75% solution), 151.10 g sodium vinyl sulfonate (25% solution), 1.15 g sodium acetate, 28.96 g acrylic acid and 1,957.98 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out. After the reaction was complete, a solution of 3.78 g TERGITOL 15S5, 20.40 g TERGITOL 15S40 (70% solution), 23.92 g AEROSOL A102 (31% solution) and 3.78 g AEROSOL OT-75 (755 solution) was added to the reactor.

The contents were then cooled to 55° C. and transferred to a 20 liter vessel to remove any unreacted ethylene. The following solutions were added to reduce the amount of unreacted monomer: 3.53 g t-butyl hydroperoxide in 14.35 g water and 3.53 g sodium formaldehyde sulfoxylate in 14.35 g water.

The physical properties of the latex were:

| % Solids | 48.9% |
| % Ethylene | 66% |
| Viscosity | 40 cP |
| Residual VA | 5050 ppm |
| Particle Size | 166 nm |

The batch was stable for over a week.

EXAMPLE 7

55° C. Reaction

The reactor was charged with 2,896.04 g water, 5.29 g AEROSOL A102 (31% solution), 1.51 g TERGITOL 15S5, 6.30 g TERGITOL 15S40, (70% solution), 75.55 g Sodium Vinyl Sulfonate (25% solution), 10.07 g iron sulfate hexahydrate (1% solution), 10.07 g VERSENE, 1.01 g sodium formaldehyde sulfoxylate, 0.33 g sodium acetate and 100.73 g vinyl acetate. The pH of the initial charge (minus vinyl acetate) was adjusted to pH 4 with phosphoric acid. The reactor was then purged with nitrogen and with ethylene and heated with agitation to 40° C., then pressurized to 800 psi ethylene. Addition of a t-butyl hydroperoxide solution (348.12 g water and 71.93 g t-butyl hydroperoxide) and a buffered sodium formaldehyde sulfoxylate solution (349.57 g water, 64.32 g sodium formaldehyde sulfoxylate and 3.04 g sodium acetate) was commenced at a 2 hour addition rate. When temperature rise indicated initiation, the jacket temperature was increased to 60° C. and a slow addition of an emulsified monomer mix consisting of 579.21 g water, 23.42 g TERGITOL 15S5, 127.43 g TERGITOL 15S40 (70% solution), 147.32 g AEROSOL A102 (31% solution), 23.30 g AEROSOL OT-75 (75% solution), 151.10 g sodium vinyl sulfonate (25% solution), 1.15 g sodium acetate, 28.96 g acrylic acid and 1,957.98 g vinyl acetate was begun at a 3.5 hour rate. When the temperature reached 55° C., the ethylene pressure was increased to 1100 psi and set for the automatic mode where pressure would be maintained at 1100 psi during the course of the slow addition. The jacket was then lowered to 50° C. and oxidant and reductant rates were adjusted manually to maintain a reaction temperature of 55° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out.

The contents were then cooled to 55° C. and transferred to a 20 liter vessel to remove any unreacted ethylene. The following solutions were added to reduce the amount of unreacted monomer: 3.53 g t-butyl hydroperoxide in 14.35 g water and 3.53 g sodium formaldehyde sulfoxylate in 14.35 g water.

The physical properties of the latex were:

| % Solids | 48.8% |
|---|---|
| % Ethylene | 61% |
| Viscosity | 48 cP |
| pH | 5.6 |
| Residual VA | 4100 ppm |

The batch was stable for over a week.

EXAMPLE 8

Lower SVS in Initial Charge

The reactor was charged with 2976.58 g water, 5.21 g AEROSOL A102 (31% solution), 1.49 g TERGITOL 15S5, 6.20 g TERGITOL 15S40, (70% solution), 3.72 g Sodium Vinyl Sulfonate (25% solution), 9.92 g iron sulfate hexahydrate (1% solution), 9.92 g VERSENE, 0.99 g sodium formaldehyde sulfoxylate, 0.32 g sodium acetate and 99.22 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (364.34 g water and 75.28 g t-butyl hydroperoxide) and a buffered sodium formaldehyde sulfoxylate solution (362.92 g water, 66.88 g sodium formaldehyde sulfoxylate and 3.15 g sodium acetate) was commenced at a 2 hour addition rate. When temperature rise indicated initiation, the jacket temperature was increased to 70° C. and a slow addition of an emulsified monomer mix consisting of 570.51 g water, 23.07 g TERGITOL 15S5, 125.51 g TERGITOL 15S40 (70% solution), 145.11 g AEROSOL A102 (31% solution), 22.95 g AEROSOL OT-75 (75% solution), 148.83 g sodium vinyl sulfonate (25% solution), 1.13 g sodium acetate, 28.53 g acrylic acid and 1,928.58 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out.

The contents were then cooled to 55° C. and transferred to a 20 liter vessel to remove any unreacted ethylene. The following solutions were added to reduce the amount of unreacted monomer: 3.47 g t-butyl hydroperoxide in 14.14 g water and 3.47 g sodium formaldehyde sulfoxylate in 14.14 g water.

The physical properties of the latex were:

| % Solids | 47.9% |
|---|---|
| % Ethylene | 60% |
| Viscosity | 56 cP |
| pH | 5.3 |
| Residual VA | 5410 ppm |
| Particle Size | 179 nm |

The batch was stable. A similar batch, prepared without acrylic acid, was also stable.

EXAMPLE 9

Higher SVS in Initial Charge

The reactor was charged with 2856.91 g water, 5.22 g AEROSOL A102 (31% solution), 1.49 g TERGITOL 15S5, 6.21 g TERGITOL 15S40, (70% solution), 111.79 g Sodium Vinyl Sulfonate (25% solution), 9.94 g iron sulfate hexahydrate (1% solution), 9.94 g VERSENE, 0.99 g sodium formaldehyde sulfoxylate, 0.32 g sodium acetate and 99.37 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (364.34 g water and 75.28 g t-butyl hydroperoxide) and a buffered sodium formaldehyde sulfoxylate solution (362.92 g water, 66.88 g sodium formaldehyde sulfoxylate and 3.15 g sodium acetate) was commenced at a 2 hour addition rate. When temperature rise indicated initiation, the jacket temperature was increased to 70° C. and a slow addition of an emulsified monomer mix consisting of 571.38 g water, 23.10 g TERGITOL 15S5, 125.70 g TERGITOL 15S40 (70% solution), 145.33 g AEROSOL A102 (31% solution), 22.99 g AEROSOL OT-75 (75% solution), 149.06 g sodium vinyl sulfonate (25% solution), 1.14 g sodium acetate, 28.57 g acrylic acid and 1,931.52 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out.

The contents were then cooled to 55° C. and transferred to a 20 liter vessel to remove any unreacted ethylene. The following solutions were added to reduce the amount of unreacted monomer: 3.48 g t-butyl hydroperoxide in 14.16 g water and 3.48 g sodium formaldehyde sulfoxylate in 14.16 g water.

The physical properties of the latex were:

| % Solids | 49.3% |
|---|---|
| % Ethylene | 59% |
| Viscosity | 60 cP |
| pH | 5.4 |
| Residual VA | 5830 ppm |

The batch was stable. A similar batch, prepared without acrylic acid, was also stable.

EXAMPLE 10

Use Example 4 as a Seed

The reactor was charged with 2782.98 g water, 193.60 g polymer in Example 4, 72.60 g Sodium Vinyl Sulfonate (25% solution), 9.68 g iron sulfate hexahydrate (1% solution), 9.68 g VERSENE, 0.99 g sodium formaldehyde sulfoxylate, 0.31 g sodium acetate and 100.73 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (347.08 g water and 71.71 g t-butyl hydroperoxide) and a buffered sodium formaldehyde sulfoxylate solution (351.26 g water, 64.64 g sodium formaldehyde sulfoxylate and 3.05 g sodium acetate) was commenced at a 2 hour addition rate. When temperature rise indicated initiation, the jacket temperature was increased to 70° C. and a slow addition of an emulsified monomer mix consisting of 556.60 g water, 22.02 g TERGITOL 15S5, 119.31 g TERGITOL 15S40 (70% solution), 138.42 g AEROSOL A102 (31% solution), 22.39 g AEROSOL OT-75 (75% solution), 145.20 g sodium vinyl sulfonate (25% solution), 1.11 g sodium acetate, 27.83 g acrylic acid and 1,881.54 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out. After the reaction was complete, a solution of 3.63 g TERGITOL 15S5, 19.60 g TERGITOL 15S40 (70% solution), 22.99 g AEROSOL A102 (31% solution) and 3.63 g AEROSOL OT-75 (755 solution) was added to the reactor.

The contents were then cooled to 55° C. and transferred to a 20 liter vessel to remove any unreacted ethylene. The following solutions were added to reduce the amount of unreacted monomer: 3.48 g t-butyl hydroperoxide in 14.16 g water and 3.48 g sodium formaldehyde sulfoxylate in 14.16 g water.

The physical properties of the latex were:

| | | |
|---|---|---|
| | % Solids | 48.8% |
| | % Ethylene | 64% |
| | Viscosity | 58 cP |
| | pH | 5.2 |
| | Residual VA | 5100 ppm |

The batch was stable. A similar batch, prepared without acrylic acid, was also stable.

EXAMPLES 11–20

Functionalized Copolymers and Control

In a typical procedure, the reactor was charged with 2896.43 g water, 2.14 g TERGITOL 15S5, 9.65 g TERGITOL 15S40, (70% solution), 75.60 g Sodium Vinyl Sulfonate (25% solution), 10.07 g iron sulfate hexahydrate (1% solution), 10.07 g VERSENE, 1.01 g sodium formaldehyde sulfoxylate, 0.33 g sodium acetate and 100.74 g vinyl acetate. The pH of the initial charge (minus vinyl acetate) was adjusted to pH 4 with phosphoric acid. The reactor was then purged with nitrogen and with ethylene and heated with agitation to 50° C., then pressurized to 800 psi ethylene. Addition of a t-butyl hydroperoxide solution (406.17 g water and 83.92 g t-butyl hydroperoxide) and a buffered sodium formaldehyde sulfoxylate solution (406.17 g water, 74.75 g sodium formaldehyde sulfoxylate and 3.53 g sodium acetate) was commenced at a 2 hour addition rate. When temperature rise indicated initiation, the jacket temperature was increased to 70° C. and a slow addition of an emulsified monomer mix consisting of 579.24 g water, 23.06 g TERGITOL 15S5, 124.39 g TERGITOL 15S40 (70% solution), 152.81 g AEROSOL A102 (31% solution), 23.30 g AEROSOL OT-75 (75% solution), 151.11 g sodium vinyl sulfonate (25% solution), 1.15 g sodium acetate, X g functional monomer (see Table I) and 1958.08 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 60° C. The jacket temperature was lowered as needed to control temperature if oxidant and reductant rates approach minimum practical rates. Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out.

The contents were then cooled to 55° C. and transferred to a 20 liter vessel to remove any unreacted ethylene. The following solutions were added to reduce the amount of unreacted monomer: 3.53 g t-butyl hydroperoxide in 14.36 g water and 3.53 g sodium formaldehyde sulfoxylate in 14.36 g Measurement of the ethylene content by the C-13 NMR technique was complicated by the presence of the functionalized comonomers and could not be obtained. However, ethylene uptake as observed during the course of the polymerization was similar to that of previous batches. Tg measurements by DSC are not informative; all materials show substantial tack.

Table I gives the approximate compositions of the polymers in examples 11-20. NMA is 48% solids, acrylamide is 50% solids, hydroxyethyl acrylate is 100% solids and ammonium AMPS is 50% solids.

TABLE I

EVA Polymer Composition

Compositions in Parts (g)

| Example # | Ethylene (est.) | Vinyl Acetate (est.) | Functional monomer (X g) |
|---|---|---|---|
| 11 | 60 | 40 | None (0 g) |
| 12 | 60 | 39.5 | 0.5 N-Methylol Acrylamide (61.12 g) |
| 13 | 60 | 36 | 4.0 N-Methylol Acrylamide (486.85 g) |
| 14 | 60 | 36 | 4.0 N-Methylol Acrylamide (486.85 g) |
| 15 | 60 | 39.5 | 0.5 Acrylamide (53.62 g) |
| 16 | 60 | 36 | 4.0 Acrylamide (428.94 g) |
| 17 | 60 | 39 | 1.0 Hydroxyethyl Acrylate (53.62 g) |
| 18 | 60 | 37 | 3.0 Hydroxyethyl Acrylate (160.85 g) |

TABLE I-continued

EVA Polymer Composition

Compositions in Parts (g)

| Example # | Ethylene (est.) | Vinyl Acetate (est.) | Functional monomer (X g) |
|---|---|---|---|
| 19 | 60 | 39.5 | 0.5 Ammonium Acrylamidylpropyl Sulfonate (53.62 g) |
| 20 | 60 | 36 | 4.0 Ammonium Acrylamidylpropyl Sulfonate (428.94 g) |

Table II gives the properties of the emulsions produced in Examples 11–20.

TABLE II

EVA Polymer Properties

| Example # | Comments | % Solids | Viscosity cP | pH |
|---|---|---|---|---|
| 11 | No functionalized monomer | 49.0 | 75 | 5.7 |
| 12 | | 49.8 | 66 | 5.8 |
| 13 | Initial E pressure 1100 psi | 50.1 | 155 | 5.5 |
| 14 | | 49.5 | 360 | 5.6 |
| 15 | | 50.8 | 78 | 6.3 |
| 16 | | 48.9 | 538 | 5.9 |
| 17 | | 49.8 | 64 | 6.2 |
| 18 | | 48.5 | 82 | 5.7 |
| 19 | | 50.1 | 72 | 5.4 |
| 20 | | 49.3 | 66 | 5.4 |

Table III summarizes adhesion performance of these unformulated polymers on stainless steel panel and Table IV provides adhesion data for high density polyethylene (HDPE).

TABLE III

Adhesion Performance of EVA's Without Formulation (Stainless steel panel)

| Ex. # | Coat Wt. (#/r) | Bond strength (g/in), 180° peel | | | Loop Tack (oz/in$^2$) | 4 PSI shear (hours) 1" × 1"/2 kg |
|---|---|---|---|---|---|---|
| | | Initial | 24 hrs, RT | 24 hrs, 95% RH, 100° F. | | |
| 11 | 12.6 | 7.3 AF | 4.7 AF | 3.3 AF | 1.0 | 0 |
| 12 | 12.9 | 40.5 AF | 52.0 AF | 2.0 AF | 3.8 | 26.38 |
| 13 | 12.4 | 647.0 AF | 712.0 AF | 7.0 AF | 3.4 | 55.81 |
| 14 | 12.3 | 573.3 AF | 635.0 AF | 1.0 AF | 3.2 | 96.40 |
| 15 | 12.2 | 29.0 AF | 36.3 AF | 1.7 AF | 2.3 | 10.14 |
| 16 | 12.0 | 136.5 AF | 465.0 AF | 9.0 AF | 2.3 | 22.75 |
| 17 | 12.4 | 16.0 AF | 33.0 AF | 7.7 AF | 0.5 | 5.82 |
| 18 | 12.8 | 140.7 AF | 714.0 AF | 8.3 AF | 3.2 | 15.77 |
| 19 | 12.5 | 16.0 AF | 49.0 AF | 10.0 AF | 3.6 | 6.32 |
| 20 | 12.5 | 31.3 AF | 47.7 AF | 10.0 AF | 4.0 | 0.03 |

TABLE IV

Adhesion Performance of EVA's Without Formulation (HDPE)

| Example # | Coating weight (#/r) | Bond strength (g/in), 180° peel | |
|---|---|---|---|
| | | Initial | 24 hrs, 95% RH, 100° F. |
| 11 | 12.6 | 34.7 AF | 41.7 AF |
| 12 | 12.9 | 80.3 AF | 377 AF |
| 13 | 12.4 | 213.0 AF | 470 AF |
| 14 | 12.3 | 211.3 AF | 483 AF |
| 15 | 12.2 | 51.3 AF | 188 AF |
| 16 | 12.0 | 106.5 AF | 513.5 AF |
| 17 | 12.4 | 96.3 AF | 222 AF |
| 18 | 12.8 | 568.3 AF | 585 AF |
| 19 | 12.5 | 56.3 AF | 184.7 AF |
| 20 | 12.5 | 60.7 AF | 45 AF |

The NMA-containing samples are superior to the Example 11 that contains no functional monomer. The adhesive properties of the NMA-containing samples are remarkably good for unformulated compounds. The properties of the ethylene-vinyl acetate copolymers containing the other functional comonomers also look interesting. It is surprising that peel, shear and tack increase as the functional comonomer level increases.

Comparative Example 1

A sample of DURO-SET E-646 (EVA/N-methylol acrylamide, National Starch and Chemical) with 1% ammonium chloride, was tested in the same manner as samples 11–20.

Comparative Example 2

A sample of DURO-SET E LITE 22 (EVA/N-methylol acrylamide, National Starch and chemical) was tested in the same manner as samples 11–20.

Table V gives the results of testing for use as nonwoven binder.

TABLE V

Performance as Nonwoven Binder

| Examples | Pick-up (%) | Add-on (%) | Grams/Meter$^2$ | condition | Pk load (gf) | std. | PK elong (%) | Elmendorf tear (gf) CMD |
|---|---|---|---|---|---|---|---|---|
| Comp 1 w/1% NH4Cl | 21.2 | 17.4 | 115.1 | dry | 7237 | 200 | 9.1 | 232 |
| | | | | 1' in 1% Aerosol-OT | 4550 | 167 | 14.3 | |
| | | | | 1' in MEK | 4549 | 178 | 5.5 | |
| | | | | 5' in 3% NaCl | 4752 | 208 | 14.8 | |
| Comp 2 As supplied | 19.2 | 16.1 | 114.8 | dry | 7669 | 466 | 8.8 | 228 |
| | | | | 1' in 1% Aerosol-OT | 4278 | 170 | 13.3 | |
| | | | | 1' in MEK | 4961 | 176 | 5.8 | |
| | | | | 5' in 3% NaCl | 4220 | 176 | 13.3 | |
| 11 (non-functional) As supplied | 19.3 | 16.2 | 112.9 | dry | 2183 | 47 | 4.2 | 252 |
| | | | | 1' in 1% Aerosol-OT | 323 | 17 | 4.0 | |
| | | | | 1' in MEK | 643 | 18 | 2.1 | |
| | | | | 5' in 3% NaCl | 345 | 17 | 4.1 | |
| 12 (0.5 NMA) w/1% NH4Cl | 19.8 | 16.5 | 113.9 | dry | 3007 | 76 | 5.2 | 228 |
| | | | | 1' in 1% Aerosol-OT | 1526 | 46 | 9.5 | |
| | | | | 1' in MEK | 1461 | 58 | 2.9 | |
| | | | | 5' in 3% NaCl | 1607 | 30 | 9.5 | |
| 13 (4.0 NMA) w/1% NH4Cl | 20.1 | 16.7 | 113.9 | dry | 3974 | 110 | 5.6 | 204 |
| | | | | 1' in 1% Aerosol-OT | 2686 | 68 | 9.3 | |
| | | | | 1' in MEK | 2833 | 55 | 4.1 | |
| | | | | 5' in 3% NaCl | 2835 | 60 | 9.5 | |
| 15 (0.5 ACM) As supplied | 19.8 | 16.5 | 114.2 | dry | 2426 | 106 | 4.4 | 232 |
| | | | | 1' in 1% Aerosol-OT | 401 | 31 | 4.7 | |
| | | | | 1' in MEK | 643 | 28 | 2.4 | |
| | | | | 5' in 3% NaCl | 446 | 27 | 5.5 | |
| 16 (4.0 ACM) As supplied | 20.5 | 17.0 | 116.1 | dry | 3177 | 109 | 5.2 | 236 |
| | | | | 1' in 1% Aerosol-OT | 661 | 61 | 8.1 | |
| | | | | 1' in MEK | 986 | 68 | 2.7 | |
| | | | | 5' in 3% NaCl | 764 | 37 | 8.8 | |
| 17 (1.0 HEA) As supplied | 19.5 | 16.4 | 114.2 | dry | 2384 | 61 | 4.6 | 244 |
| | | | | 1' in 1% Aerosol-OT | 384 | 10 | 4.4 | |
| | | | | 1' in MEK | 593 | 33 | 2.0 | |
| | | | | 5' in 3% NaCl | 418 | 26 | 5.2 | |
| 18 (3.0 HEA) As supplied | 20.5 | 17.0 | 113.1 | dry | 2315 | 99 | 5.3 | 252 |
| | | | | 1' in 1% Aerosol-OT | 305 | 21 | 5.4 | |
| | | | | 1' in MEK | 600 | 21 | 2.8 | |
| | | | | 5' in 3% NaCl | 347 | 15 | 5.7 | |
| 19 (0.5 AMPS) As supplied | 18.6 | 15.7 | 111.5 | dry | 2288 | 56 | 3.9 | 232 |
| | | | | 1' in 1% Aerosol-OT | 297 | 19 | 4.0 | |
| | | | | 1' in MEK | 582 | 33 | 2.3 | |
| | | | | 5' in 3% NaCl | 336 | 19 | 4.5 | |
| 20 (4.0 AMPS) As supplied | 19 | 16.0 | 112.2 | dry | 2357 | 61 | 4.0 | 212 |
| | | | | 1' in 1% Aerosol-OT | 582 | 45 | 6.1 | |
| | | | | 1' in MEK | 765 | 91 | 2.3 | |
| | | | | 5' in 3% NaCl | 636 | 35 | 6.0 | |

EXAMPLE 21–23

Higher Levels of NMA

Examples 21–23 were prepared similar to Examples 11–20. Table VI summarizes estimated composition of these polymers.

TABLE VI

EVA Polymer Composition with More NMA

Compositions in Parts (g)

| Example # | Ethylene (est.) | Vinyl Acetate (est.) | Functional monomer (X g) |
|---|---|---|---|
| 21 | 60 | 35 | 5.0 N-Methylol Acrylamide (609.10 g) |
| 22 | 60 | 34 | 6.0 N-Methylol Acrylamide (731.35 g) |
| 23 | 60 | 32 | 8.0 N-Methylol Acrylamide (975.13 g) |

EXAMPLE 24

Use of Polymeric Colloid Stabilizer

Synthesis of polymer colloid: A 2 liter four-neck glass flask equipped with a condenser, thermometer and stainless steel anchor stirrer is charged with 471.1 grams de-ionized water. The flask was purged with a gentle stream of nitrogen for 30 minutes. Next, 16.6 grams of acrylic acid and 166.8 grams of sodium AMPS were added, and the mixture was heated to 80° C. with a water bath. At 76° C., a solution of 15 grams of deionized water and 0.5 grams of sodium persulfate were added and the reaction was allowed to heat to 80° C. The solution was held at 80° C. then cooled and discharged. The resulting solution was 15.3% solids with a pH of 3.1.

A 10-liter reactor was charged with 5444.97 g water, 889.71 g polymer of the polymer colloid described above, 5.12 g iron sulfate hexahydrate (1% solution), 5.12 g VERSENE, 0.51 g sodium formaldehyde sulfoxylate, 0.17 g sodium acetate and 51.15 g vinyl acetate. The pH of the initial charge (minus vinyl acetate) was 3.5 and was not further adjusted. The reactor was then purged with nitrogen and with ethylene and heated with agitation to 50° C., then pressurized to 800 psi ethylene. Addition of a t-butyl hydroperoxide solution (128.16 g water and 26.47 g t-butyl hydroperoxide) and a buffered sodium formaldehyde sulfoxylate solution (128.16 g water, 23.59 g sodium formaldehyde sulfoxylate and 1.11 g sodium acetate) was commenced at a 2 hour addition rate. When temperature rise indicated initiation, the jacket temperature was increased to 70° C. and a slow addition of an emulsified monomer mix consisting of 294.11 g water, 12.25 g TERGITOL 15S5, 65.61 g TERGITOL 15S40 (70% solution), 77.59 g AEROSOL A102 (31% solution), 11.83 g AEROSOL OT-75 (75% solution), 76.77 g sodium vinyl sulfonate (25% solution), 0.58 g sodium acetate and 994.23 g vinyl acetate was begun at a 3.5 hour rate. When the temperature reached 65° C., the ethylene pressure was increased to 1100 psi and set for the automatic mode where pressure would be maintained at 1100 psi during the course of the slow addition. The jacket was then lowered to 60° C. and oxidant and reductant rates were adjusted manually to maintain a reaction temperature of 65° C. The jacket temperature was lowered as needed to control temperature if oxidant and reductant rates approach minimum practical rates, Fifteen minutes after the end of the emulsified monomer mix slow addition, the ethylene valve was shut and the ethylene pressure allowed to decrease. The t-butyl hydroperoxide and sodium formaldehyde sulfoxylate solutions were fed until the ethylene pressure levelled out.

The contents were then cooled to 55° C. and transferred to a 20 liter vessel to remove any unreacted ethylene. The following solutions were added to reduce the amount of unreacted monomer: 1.79 g t-butyl hydroperoxide in 7.29 g water and 1.79 g sodium formaldehyde sulfoxylate in 7.29 g water.

The physical properties of the latex were:

| % Solids | 27.3% |
|---|---|
| Viscosity | 94 cP |
| pH | 5.2 |

The batch was stable.

EXAMPLE 25

In-situ Colloid Process

A 2 liter four-neck glass flask equipped with a condenser, thermometer and stainless steel anchor stirrer is charged with 753 grams deionized water. The flask was purged with a gentle stream of nitrogen for 30 minutes. Next, 30 grams of acrylic acid and 60 grams of sodium 2-acrylamido-2-methyl-1-propanesulfonic acid (sodium AMPS) were added, and the mixture was heated to 80° C. with a water bath. At 76° C., a solution of 45 grams of deionized water and 1.5 grams of sodium persulfate were added and the reaction was allowed to heat to 80° C. Ten minutes after the addition of the sodium persulfate solution a quantity of 90 grams of methyl methacrylate, 150 grams of butyl acrylate, 60 grams of acrylic acid and 0.30 grams of dodecyl mercaptan were added over 2 hours via monomer pump. The resulting emulsion was 29.5% solids with a pH of 2.7 and a viscosity of 14000 cPs.

EXAMPLE 26

The polymerization was conducted in the same manner as Example 25 except the flask was charged with 722 grams of deionized water. No acrylic acid was added and 120 grams of sodium AMPS were added before heating to 80° C. The monomer composition was 135 grams of methyl methacrylate, 150 grams of butyl acrylate, 15 grams of acrylic acid were added. Dodecyl mercaptan was deleted from the monomer slow add composition. The resulting emulsion was 31.4% solids with a pH of 2.6 and a viscosity of 65.5 cPs. The polymer-dried films dispersed in water, but were insoluble in 3% salt solutions.

EXAMPLE 27

The polymerization was conducted in the same manner as Example 25 except the flask was charged with 733 grams of deionized water. Ten grams of acrylic acid and 100 grams of sodium AMPS were added before heating to 80° C. The monomer composition was 135 grams of methyl methacrylate, 150 grams of butyl acrylate, 15 grams of acrylic acid were added. The resulting emulsion was 29.8% solids with a pH of 2.7 and a viscosity of 510 cPs. The polymer dried films dispersed in water, but were insoluble in 3% salt solutions.

EXAMPLE 28

The polymerization was conducted in the same manner as Example 26 except the flask was charged with 645 grams of deionized water. About 2.5 grams of acrylic acid was added and 25 grams of sodium AMPS were added before heating to 80° C. A post addition of 20 grams of deionized water and 5 grams of ammonium hydroxide were added. The resulting emulsion was 29.7% solids with a pH of 5.8 and a viscosity of 18 cPs. The polymer dried films dispersed in water, but were insoluble in 3% salt solutions.

EXAMPLE 29

The polymerization was conducted in the same manner as Example 28 except the flask was charged with 643 grams of deionized water. The monomer slow add composition was 90 grams of methyl methacrylate, 150 grams of butyl acrylate, 60 grams of acrylic acid were added. A post addition of 20 grams of deionized water and 13.3 grams of sodium hydroxide were added. The resulting emulsion was 29.6% solids with a pH of 3.8 and a viscosity of 32 cPs. The polymer dried films dispersed in water, but were insoluble in 3% salt solutions.

EXAMPLE 30

The polymerization was conducted in the same manner as Example 25 except the flask was charged with 600 grams of deionized water. Next, 2.5 grams of acrylic acid, 25 grams of sodium AMPS, 3 grams of allyl methacrylate, 30 grams of butyl acrylate were added, and the mixture was heated to 80° C. The monomer composition was 135 grams methyl methacrylate, 120 grams butyl acrylate, and 15 grams of acrylic acid. The resulting emulsion was 31.3% solids with a pH of 5.9 and a viscosity of 198 cPs. The dried films dispersed in water, but were insoluble in 3% salt solutions.

EXAMPLE 31

The polymerization was conducted in the same manner as Example 25 except instead of preparing an in-situ colloid a pre-made stabilizer was used. The stabilizer was prepared by dissolving in 55 g of an acetone/water (70/30) mixture: 43.3 of acrylic acid, 10.7 g AMPS, 35.2 g butyl acrylate, and 20 g of 2-ethylhexyl acrylate. Then 0.5g of 2,2-azobisisobutyronitrile initiator were dissolved in 20 ml of acetone. The mixture was purged with nitrogen. 120 g of an acetone/water (70/30) mixture was added to a reactor and heated to reflux under a nitrogen blanket. The monomer mixture and initiator solution were simultaneously added to the reactor over two hours, and polymerization was allowed to continue an additional two hours. Acetone was removed by distillation and 400 g of deionized water added to form a 15% polymeric stabilizer. 33.33 grams of the 15% stabilizer solution was used to stabilize the latex. The resulting latex was 30.0% solids with a pH of 3.5. The dried films dispersed in water, but were insoluble in 3% salt solutions.

What is claimed is:

1. An ethylene-vinyl acetate emulsion polymer comprising:
   a) a copolymer of ethylene and vinyl acetate having greater than 55 percent by weight ethylene wherein said copolymer is free of carboxylic acid ethylene monomer units; and
   b) a hydrophilic polymeric colloid stabilizer wherein said hydrophilic colloid comprises from 1 to 100 percent by weight of an acidic ethylenically unsaturated monomer; wherein said ethylene-vinyl acetate copolymer is water-dispersible; and wherein said ethylene-vinyl acetate copolymer is non-dispersible in an aqueous solution containing 0.5 weight percent or an inorganic salt.

2. The emulsion polymer of claim 1 wherein said emulsion polymer is alkali soluble.

3. The emulsion polymer of claim 1 wherein said emulsion polymer is surfactant-free.

4. An aqueous emulsion comprising a water-dispersible polymer which is non-dispersible in aqueous solutions containing 0.5 weight percent or more of an inorganic salt, wherein said water-dispersible polymer comprises from 1 to 100 percent by weight of a hydrophilic monomer and from 0 to 99 percent by weight of at least one non-hydrophilic monomer, wherein a film formed from said polymer has a Tg of less than 25° C.

5. The aqueous emulsion of claim 4 wherein a film formed from said polymer has a Tg of less than 0° C.

6. The aqueous emulsion of claim 4 wherein said hydrophilic monomer comprises a carboxylic acid or a mixture of carboxylic acids.

7. The aqueous emulsion of claim 4 wherein said hydrophilic monomer comprises a sulfonate-, or phosphonate-containing monomer, or mixtures thereof.

8. The aqueous emulsion of claim 4 wherein said emulsion comprises a polymeric colloid stabilizer.

9. The aqueous emulsion of claim 8 wherein said colloid stabilizer is salt sensitive.

10. The aqueous emulsion of claim 8 wherein said colloid stabilizer is not salt sensitive.

11. The aqueous emulsion of claim 8 wherein said colloid stabilizer is formed in situ.

12. The aqueous emulsion of claim 8 wherein said colloid stabilizer is neutralized to between 10 and 100 percent.

13. The aqueous emulsion of claim 4 wherein said water-dispersible polymer further comprises a graft-linker, crosslinker, or mixture thereof.

14. A high ethylene, ethylene-vinyl acetate emulsion comprising a polymer comprising greater than 55 percent by weight of ethylene.

15. The high ethylene, ethylene-vinyl acetate emulsion polymer of claim 13 wherein said polymer is free of carboxyl-containing monomers.

16. The high ethylene, ethylene-vinyl acetate emulsion of claim 13 comprising sodium vinyl sulfonate.

17. The high ethylene, ethylene-vinyl acetate emulsion polymer of claim 13 comprising up to 25 percent by weight of a functionalized monomer.

18. The high ethylene, ethylene/vinyl acetate emulsion polymer of claim 16 comprising N-methylol acrylamide.

19. A process for producing a high ethylene, ethylene-vinyl acetate emulsion polymer comprising:
   a) forming an initial charge comprising from 0 to 10 percent by weight monomer, and a stabilizer level of from 0.5 to 10 percent by weight, based on the weight of the emulsion polymer;
   b) maintaining an ethylene concentration of above 500 psi; and
   c) slowly adding a monomer feed over a period of from 1 to 10 hours, and at a reaction temperature of from 25 to 100° C.

20. The process of claim 19 wherein said ethylene concentration is above 700 psi, said monomer feed is added over a period of from 2 to 6 hours, and the reaction temperature is from 50 to 80° C.

* * * * *